(12) United States Patent
Lim et al.

(10) Patent No.: US 11,694,703 B2
(45) Date of Patent: Jul. 4, 2023

(54) AUDIO SIGNAL ENCODING AND DECODING METHOD USING LEARNING MODEL, TRAINING METHOD OF LEARNING MODEL, AND ENCODER AND DECODER THAT PERFORM THE METHODS

(71) Applicant: ELECTRONICS AND TELECOMMUNICATIONS RESEARCH INSTITUTE, Daejeon (KR)

(72) Inventors: Woo-taek Lim, Sejong (KR); Seung Kwon Beack, Daejeon (KR); Jongmo Sung, Daejeon (KR); Tae Jin Lee, Sejong (KR); Inseon Jang, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/672,041

(22) Filed: Feb. 15, 2022

(65) Prior Publication Data

US 2022/0262378 A1 Aug. 18, 2022

(30) Foreign Application Priority Data

Feb. 16, 2021 (KR) ........................ 10-2021-0020597

(51) Int. Cl.
*G10L 19/13* (2013.01)
*G06N 3/08* (2023.01)
(Continued)

(52) U.S. Cl.
CPC ................ *G10L 19/13* (2013.01); *G06N 3/08* (2013.01); *G10L 25/12* (2013.01); *G06T 9/002* (2013.01)

(58) Field of Classification Search
CPC ................................ G10L 19/13; G06T 9/002
See application file for complete search history.

(56) References Cited

U.S. PATENT DOCUMENTS 5,255,346 A * 10/1993 Wu ........................ H04N 19/94
375/240.22
7,599,833 B2 10/2009 Sung
(Continued)

FOREIGN PATENT DOCUMENTS

WO 2015108358 A1 7/2015

OTHER PUBLICATIONS

Douglas 0 'Shaughnessy, "Linear predictive coding," IEEE, Feb. 1988. (Year: 1988).*

(Continued)

*Primary Examiner* — Feng-Tzer Tzeng

(57) ABSTRACT

An audio signal encoding and decoding method using a learning model, a training method of the learning model, and an encoder and decoder that perform the method, are disclosed. The audio signal decoding method may include extracting a first residual signal and a first linear prediction coefficient by decoding a bitstream received from an encoder, generating a first audio signal from the first residual signal using the first linear prediction coefficient, generating a second linear prediction coefficients and a second residual signal from the first audio signal, obtaining a third linear prediction coefficient by inputting the second linear prediction coefficient into a trained learning model, and generating a second audio signal from the second residual signal using the third linear prediction coefficient.

7 Claims, 5 Drawing Sheets

(51) Int. Cl.
    *G10L 25/12*        (2013.01)
    *G06T 9/00*         (2006.01)

(56) References Cited

U.S. PATENT DOCUMENTS

| | | |
|---|---|---|
| 8,484,038 B2 | 7/2013 | Bessette |
| 10,249,308 B2 | 4/2019 | Sung |
| 2018/0068667 A1 | 3/2018 | Lee et al. |

OTHER PUBLICATIONS

Viswanathan, et al. "Design of a Robust Baseband LPC Coder for Speech Transmission Over 9.6 Kbit/s Noisy Channels," IEEE Trans. Communications, Apr. 1982. (Year: 1982).*

Jayant, "Digital Coding of Speech Waveforms: PCM, DPCM, and DM Quantizers," Proceedings of the IEEE, May 1974. (Year: 1974).*

Ziyue Zhao et al., "Convolutional Neural Networks to Enhance Coded Speech", Electrical Engineering and Systems Science, Jan. 24, 2019, pp. 1-17, www.arxiv.org/abs/1806.09411.

* cited by examiner

AUDIO SIGNAL ENCODING AND DECODING METHOD USING LEARNING MODEL, TRAINING METHOD OF LEARNING MODEL, AND ENCODER AND DECODER THAT PERFORM THE METHODS

CROSS-REFERENCE TO RELATED APPLICATION

This application claims the benefit of Korean Patent Application No. 10-2021-0020597 filed on Feb. 16, 2021, in the Korean Intellectual Property Office, the entire disclosure of which is incorporated herein by reference for all purposes.

BACKGROUND

1. Field of the Invention

The present disclosure relates to an audio signal encoding and decoding method using a learning model, a training method of the learning model, and an encoder and decoder that perform the method.

2. Description of the Related Art

Audio coding technology has been continuously developed, and in recent years, 4th generation MPEG audio coding technology, unified speech and audio coding (USAC), has been increasingly utilized. However, in order to provide high-quality sound, advanced audio coding (AAC), which is a second-generation MPEG audio coding technology, is still used.

Research to replace AAC is being conducted, and researches on audio coding technology applying deep learning are highly active. However, a technology that can completely replace AAC has not yet been developed, so a technology capable of improving audio restoration performance with a low bit rate is required.

SUMMARY

Example embodiments provide a method, an encoder and a decoder capable of increasing the restoration performance of an audio signal using a linear prediction coding as a learning model.

According to an example embodiment, an audio signal decoding method of an example embodiment may include extracting a first residual signal and a first linear prediction coefficient by decoding a bitstream received from an encoder, generating a first audio signal from the first residual signal using the first linear prediction coefficient, generating a second linear prediction coefficients and a second residual signal from the first audio signal, obtaining a third linear prediction coefficient by inputting the second linear prediction coefficient into a trained learning model and generating a second audio signal from the second residual signal using the third linear prediction coefficient.

The learning model may generate an output linear prediction coefficient from an input linear prediction coefficient, and be trained using an original linear prediction coefficient extracted from an original audio signal received by the encoder as target data.

The method may further include extracting a second residual signal and a second linear prediction coefficient from the second audio signal.

According to an example embodiment, a training method of a learning model used to decode an audio signal may include receiving a bitstream from an encoder, extracting a first residual signal and a first linear prediction coefficient from the bitstream and decoding the first residual signal generating an audio signal from the first residual signal using the first linear prediction coefficient, generating second linear prediction coefficients and a second residual signal from the audio signal, comparing the first linear prediction coefficient with a third linear prediction coefficient obtained by inputting the second linear prediction coefficient into the learning model and updating a parameter of the learning model based on the comparison result.

The first linear prediction coefficient may be generated using linear predictive coding from an original audio signal received by the encoder.

According to an example embodiment, an audio signal encoding method may include extracting a residual signal and a linear prediction coefficient from the audio signal, encoding the residual signal and converting the encoded residual signal and the linear prediction coefficient into a bitstream.

The linear prediction coefficient is used as target data for training of a learning model used by a decoder, and the learning model may generate an output linear prediction coefficient from an input linear prediction coefficient, and be trained using an original linear prediction coefficient extracted from an original audio signal received by the encoder as target data.

The audio signal may be restored by repeatedly processing linear prediction analysis and linear prediction synthesis using the learning model by the decoder.

According to an example embodiment, a decoder configured to perform an audio signal decoding method may include a processor, and the processor is configured to extract a first residual signal and a first linear prediction coefficient by decoding a bitstream received from an encoder, generate a first audio signal from the first residual signal using the first linear prediction coefficient, generate a second linear prediction coefficients and a second residual signal from the first audio signal, obtain a third linear prediction coefficient by inputting the second linear prediction coefficient into a trained learning model, and generate a second audio signal from the second residual signal using the third linear prediction coefficient.

The learning model may generate an output linear prediction coefficient from an input linear prediction coefficient, and be trained using an original linear prediction coefficient extracted from an original audio signal received by an encoder as target data.

The processor may extract a second residual signal and a second linear prediction coefficient from the second audio signal.

According to an example embodiment, a decoder configured to perform a training method of a learning model used to decode an audio signal, may include a processor, and the processor is. configured to receive a bitstream from an encoder, extract a first residual signal and a first linear prediction coefficient from the bitstream, decode the first residual signal; generating an audio signal from the first residual signal using the first linear prediction coefficient, generate a second linear prediction coefficients and a second residual signal from the audio signal, compare the first linear prediction coefficient with a third linear prediction coefficient obtained by inputting the second linear prediction coefficient to the learning model, and update parameters of the learning model based on the comparison result.

The first linear prediction coefficient may be generated using linear prediction coding from an original audio signal received by the encoder.

According to an example embodiment, an encoder configured to perform an audio signal encoding method may include a processor, wherein the processor is configured to extract a residual signal and a linear prediction coefficient from an audio signal, encode the residual signal, and convert the encoded residual signal and the linear prediction coefficient into a bitstream.

The linear prediction coefficient is used as target data for training a learning model used by a decoder, and the learning model may generate an output linear prediction coefficient from the input linear prediction coefficient, and be trained using an original linear prediction coefficient extracted from an original audio signal received by the encoder as target data.

The audio signal may be restored by repeatedly processing linear prediction analysis and linear prediction synthesis using the learning model by the decoder.

Additional aspects of example embodiments will be set forth in part in the description which follows and, in part, will be apparent from the description, or may be learned by practice of the disclosure.

According to an example embodiment, it is possible to increase the restoration performance of an audio signal using a linear prediction coding as a learning model.

BREIF DESCRIPTION OF DRAWINGS

These and/or other aspects, features, and advantages of the invention will become apparent and more readily appreciated from the following description of example embodiments, taken in conjunction with the accompanying drawings of which:

DETAILED DESCRIPTION

Figure 1:
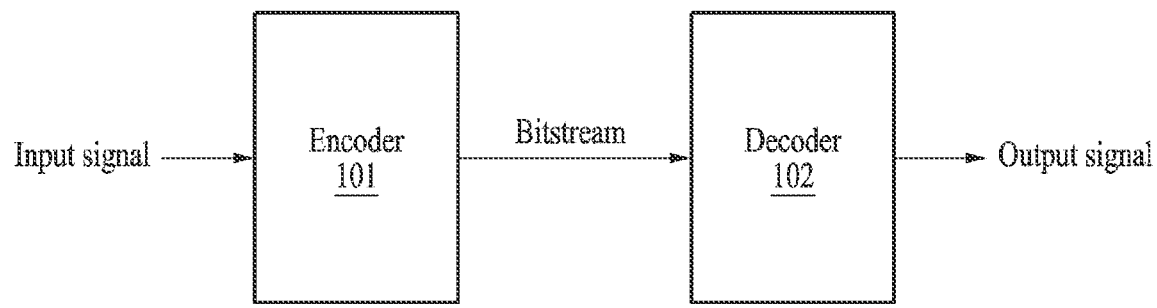
FIG. 1 is a diagram illustrating an encoder and a decoder according to an example embodiment.

Hereinafter, example embodiments will be described in detail with reference to the accompanying drawings. However, since various changes may be made to the embodiments, the scope of the patent application is not restricted or limited by these embodiments. It should be understood that all modifications, equivalents and substitutes for the embodiments are included in the scope of the present disclosure.

The terms used in the embodiments are used for the purpose of description only, and should not be construed as limiting. The singular expression includes the plural expression unless clearly intended otherwise in the context. It should be understood that, in this disclosure, terms such as "comprise" or "have" are intended to designate that a feature, number, operation, operation, component, part, or a combination thereof described herein exists, and that this does not preclude the possibility of existence or addition of one or more other features or numbers, steps, operations, components, parts, or combinations thereof.

Unless otherwise defined, all terms used herein, including technical or scientific terms, have the same meaning as commonly understood by one of the ordinary skilled in the art to which the embodiment belongs. Terms such as those defined in commonly used dictionaries should be interpreted as having a meaning consistent with the meaning in the context of the related art, and should not be interpreted in an ideal or excessively formal meaning unless explicitly defined in the present application.

Further, in describing with reference to the accompanying drawings, the same components are given the same reference numerals regardless of the reference numerals, and repeated descriptions thereof may be omitted. In describing the embodiment, if it is determined that a detailed description of a related conventional technology may unnecessarily obscure the gist of the embodiment, the detailed description thereof may be omitted.

FIG. 1 is a diagram illustrating an encoder and a decoder according to an example embodiment.

The present disclosure relates to a technique for increasing the quality of a restored audio signal using a learning model trained on a decoded audio signal and additionally processing linear prediction analysis and linear prediction synthesis in encoding and decoding an audio signal.

The encoding method of the present disclosure may be performed by the encoder 101, and the decoding method and the training method of the present disclosure may be performed by the decoder 102. Each of the encoder 101 and the decoder 102 may include a processor, and may correspond to the same electronic device.

Linear prediction analysis is to analyze an audio signal with a linear model, and may be a process of extracting a residual signal and a linear prediction coefficient (LPC) from an audio signal. It is apparent to those skilled in the art that the method of extracting the linear prediction coefficient is not limited to a specific example, and that various methods of extracting the linear prediction coefficient can be applied without departing from the technical scope of the present disclosure.

Linear prediction synthesis may be a process of generating an audio signal from a residual signal using a linear prediction coefficient. It is apparent to those skilled in the art that the method of synthesizing the linear prediction coefficient is not limited to a specific example, and that various methods of synthesizing the linear prediction coefficient can be applied without departing from the technical scope of the present disclosure.

The learning model may be a neural network model including one or more layers and one or more parameters based on deep learning. However, the type of neural network model used in the present disclosure, the size of input/output data, etc. are not limited to specific examples.

The trained learning model may receive a linear prediction coefficient and output an improved linear prediction coefficient. The improved linear prediction coefficient may mean a linear prediction coefficient closer to the original linear prediction coefficient extracted from the original audio signal received by the encoder 101 than the linear prediction coefficient before enhancement.

The learning model may be trained using the original linear prediction coefficient extracted from the original audio signal received by the encoder 101 as target data. In other words, the decoder 102 may update the parameters of the training model based on a result of comparing the linear prediction coefficient output outputted from the input linear prediction coefficient of the learning model with the original linear prediction coefficient input as the target data.

For example, the decoder 102 extracts a linear prediction coefficient from the decoded audio signal, and inputs the extracted linear prediction coefficient to the learning model as an input linear prediction coefficient to obtain an output linear prediction coefficient, and can determine the value of the loss function by comparing the output linear prediction coefficients with the original linear prediction coefficients. The decoder 102 may train the learning model by updating parameters included in the learning model such that the value of the loss function is minimized based on the value of the loss function.

Referring to FIG. 1, the encoder 101 may receive an audio signal, generate a bitstream based on the received audio signal, and transmit it to the decoder 102. The decoder 102 may generate an output signal by decoding the received bitstream. In FIG. 1, an input signal may mean an original audio signal, and an output signal may mean an audio signal restored by the decoder 102.

Figure 2:
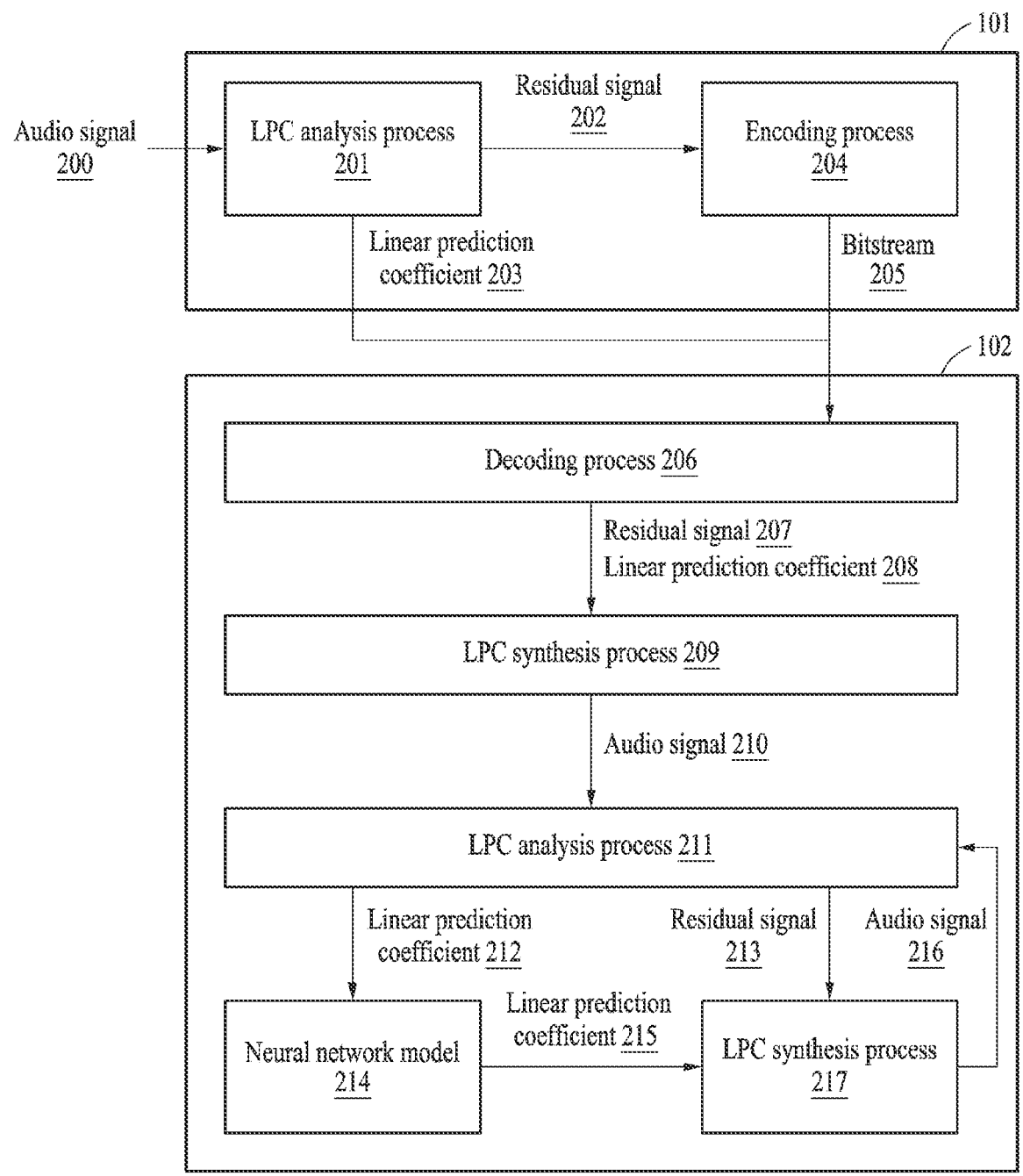
FIG. 2 is a diagram illustrating a decoding process of an audio signal in a decoder according to an example embodiment.

FIG. 2 is a diagram illustrating a decoding process of an audio signal in a decoder according to an example embodiment.

In FIG. 2, the LPC analysis process 201 and the encoding process 204 may be performed by the encoder 101, and the decoding process 206, the LPC synthesis process 209, the LPC analysis process 211, and the LPC synthesis process 217 may be performed by the decoder 102.

In the LPC analysis process 201, the encoder 101 may extract the original linear prediction coefficients 203 and the original residual signal 202 from the original audio signal 200 using linear prediction coding. In the encoding process 204, the encoder 101 encodes the original residual signal 202, and converts the encoded original residual signal 202 and the original linear prediction coefficient 203 into a bitstream 205, which the encoder 101 may send to decoder 102.

For example, the encoder 101 may generate the original residual signal 202 by whitening or flattening the original audio signal 200. The original residual signal 202 may mean a signal whitened or flattened by removing a spectral envelope component from the original audio signal 200. The original residual signal 202 may have a reduced dynamic range compared to the original audio signal 200.

In the decoding process 206, the decoder 102 extracts a first residual signal 207 and a first linear prediction coefficient 208 from the bitstream 205, and decodes the first residual signal 207. The first residual signal 207 and the first linear prediction coefficient 208 may mean the original residual signal 202 and the original linear prediction coefficient 203 generated from the original audio signal 200 in the encoder 101.

In the LPC synthesis process 209, the decoder 102 may generate a first audio signal 210 from the residual signal using the first residual signal 207 and the first linear prediction coefficient 208. The first audio signal 210 may mean a restored audio signal and may be distinguished from the original audio signal 200.

In the LPC analysis process 211, the decoder 102 may generate a second linear prediction coefficient 212 and a second residual signal 213 from the first audio signal 210 using linear prediction coding. Since the second linear prediction coefficient 212 and the second residual signal 213 are generated from the restored audio signal, they can be distinguished from the first linear prediction coefficient 208 and the first residual signal 207.

The decoder 102 may obtain a third linear prediction coefficient 215 by inputting the second linear prediction coefficient 212 to the trained neural network model 214. The neural network model 214 is a learning model, and may generate output linear prediction coefficient from input linear prediction coefficient.

The neural network model 214 may be trained using the original linear prediction coefficient 203 extracted from the original audio signal 200 received by the encoder 101 as target data. The third linear prediction coefficient 215 may mean a linear prediction coefficient output from the second linear prediction coefficient 212 by the neural network model 214.

In the LPC synthesis process 216, the decoder 102 may generate a second audio signal 216 from the second residual signal 213 using the third linear prediction coefficient 215. The second audio signal 216 may refer to an audio signal restored from the residual signal generated from the first audio signal 210 and the linear prediction coefficient output from the neural network model 214. The quality of the second audio signal may be improved compared to that of the first audio signal 210.

The second audio signal 216 may be used to extract the second linear prediction coefficient 212 and the second residual signal 213 through the LPC analysis process 211 again. Further, the second linear prediction coefficient 212 generated from the second audio signal 216 may be input to the neural network model 214 again and used to generate the third linear prediction coefficient 215.

Then, the decoder 102 regenerates the second audio signal 216 using the second residual signal 213 and the third linear prediction coefficient 215 regenerated through the LPC synthesis process 217 again. The audio signal may be of a quality closer to the original audio signal 200 than the previously generated second audio signal 216. In other words, since the LPC analysis process 211 and the LPC synthesis process 217 are repeatedly performed a predetermined number of times, the restoration quality of the finally generated second audio signal 216 may be improved.

Figure 3:
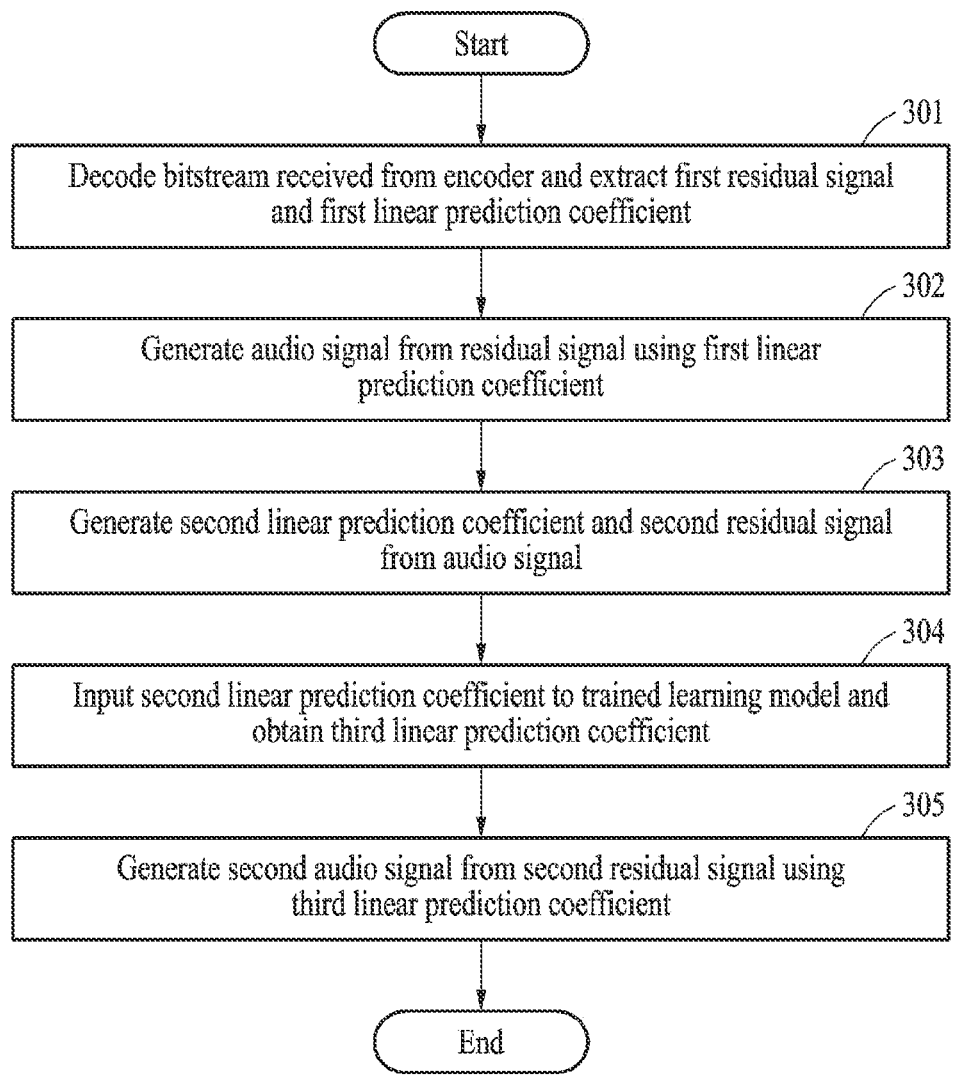
FIG. 3 is a flowchart illustrating a decoding method according to an example embodiment.

FIG. 3 is a flowchart illustrating a decoding method according to an example embodiment.

In operation 301, the decoder may decode the bitstream received from the encoder and extract a first residual signal and a first linear prediction coefficient. Step 301 may correspond to the LPC analysis process 206 of FIG. 2. The decoder may decode the first residual signal. The first residual signal and the first linear prediction coefficient may be extracted from the original audio signal by the encoder.

In operation 302, the decoder may generate a first audio signal from the first residual signal using the first linear prediction coefficient. Step 302 may correspond to the LPC synthesis process 209 of FIG. 2. The decoder may restore the first audio signal from the residual signal using the first linear prediction coefficient. Since the first audio signal is a restored audio signal, it can be distinguished from the original audio signal received by the encoder.

In operation 303, the decoder may generate a second linear prediction coefficient and a second residual signal from the first audio signal. Step 303 may correspond to the LPC analysis process 211 of FIG. 2. The decoder may additionally perform a linear prediction analysis process and a linear prediction synthesis process on the restored audio signal. In this case, the decoder may use a trained learning model. The second linear prediction coefficient and the second residual signal may mean a linear prediction coefficient and a residual signal extracted from the first audio signal through linear prediction coding.

In operation 304, the decoder may input the second linear prediction coefficient to the trained learning model and obtain a third linear prediction coefficient. The third linear prediction coefficient may be more similar to the linear prediction coefficient extracted from the original audio signal than the second linear prediction coefficient.

In operation 305, the decoder may generate a second audio signal from the second residual signal using the third linear prediction coefficient. Step 305 may correspond to the LPC synthesis process 217 of FIG. 2.

The decoder may again extract the second residual signal and the second linear prediction coefficient from the second audio signal. The decoder may process operations 304 and 305 again on the second residual signal and the second linear prediction coefficient from the extracted signal. Thus, the second audio signal is repeatedly generated, and the finally generated second audio signal may be the audio signal with the highest quality.

Figure 4:
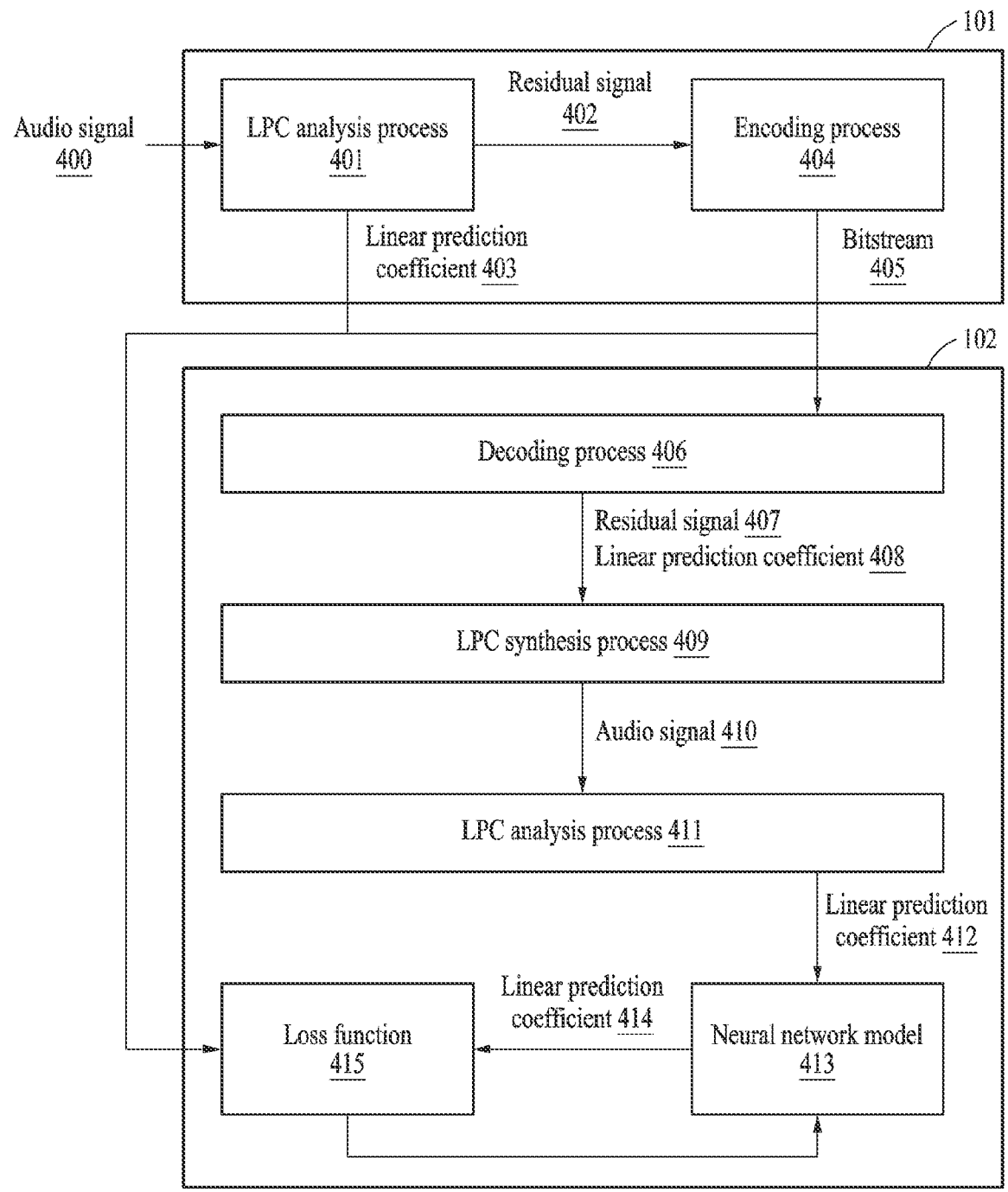
FIG. 4 is a diagram illustrating a training process of a learning model performed in a decoder according to an example embodiment.

FIG. 4 is a diagram illustrating a training process of a learning model performed in a decoder according to an example embodiment.

In FIG. 4, the LPC analysis process 401 and the encoding process 404 may be performed by the encoder 101, and the decoding process 406, the LPC synthesis process 409, and the LPC analysis process 411 are performed by the decoder 102.

In the LPC analysis process 401, the encoder 101 may extract the original linear prediction coefficients 403 and the original residual signal 402 from the original audio signal 400 using linear prediction coding. In the encoding process 404, the encoder 101 encodes the original residual signal 402, and converts the encoded original residual signal 402 and the original linear prediction coefficient 403 into a bitstream 405, which the encoder 101 may send to the decoder 102.

In the decoding process 406, the decoder 102 extracts the first residual signal 407 and the first linear prediction coefficient 408 from the bitstream 405, and decodes the first residual signal 407. The first residual signal 407 and the first linear prediction coefficient 408 may mean the original residual signal 402 and the original linear prediction coefficient 403 generated from the original audio signal 400 in the encoder 101.

In the LPC synthesis process 409, the decoder 102 may generate the first audio signal 410 from the residual signal using the first residual signal 407 and the first linear prediction coefficient 408. The first audio signal 410 may mean a restored audio signal and may be distinguished from the original audio signal 400.

In the LPC analysis process 411, the decoder 102 may generate a second linear prediction coefficient 412 and a second residual signal from the first audio signal 410 using linear prediction coding. Since the second linear prediction coefficient 412 and the second residual signal are generated from the restored audio signal, they may be distinguished from the first linear prediction coefficient 408 and the first residual signal 407.

The second linear prediction coefficient 412 may be input as training data of the neural network model. The neural network model may output a third linear prediction coefficient 414 with respect to the second linear prediction coefficient 412. The third linear prediction coefficient 414 may mean a linear prediction coefficient output from the second linear prediction coefficient 412 by the neural network model 414.

Further, the decoder 102 calculates the value of the loss function 415 based on the difference between the third linear prediction coefficient 414 output from the neural network model and the original linear prediction coefficient 403 generated from the original audio signal 400, and may update a parameter included in the neural network model such that the value of the loss function 415 is minimized.

In other words, the decoder 102 may train the neural network model according to the comparison result between the third linear prediction coefficient 414 output from the neural network model and the original linear prediction coefficient 403 generated from the original audio signal 400. For example, the decoder 102 may train a neural network model such that a difference between the third linear prediction coefficient 414 output from the neural network model and the original linear prediction coefficient 403 generated from the original audio signal 400 is minimized.

Figure 5:
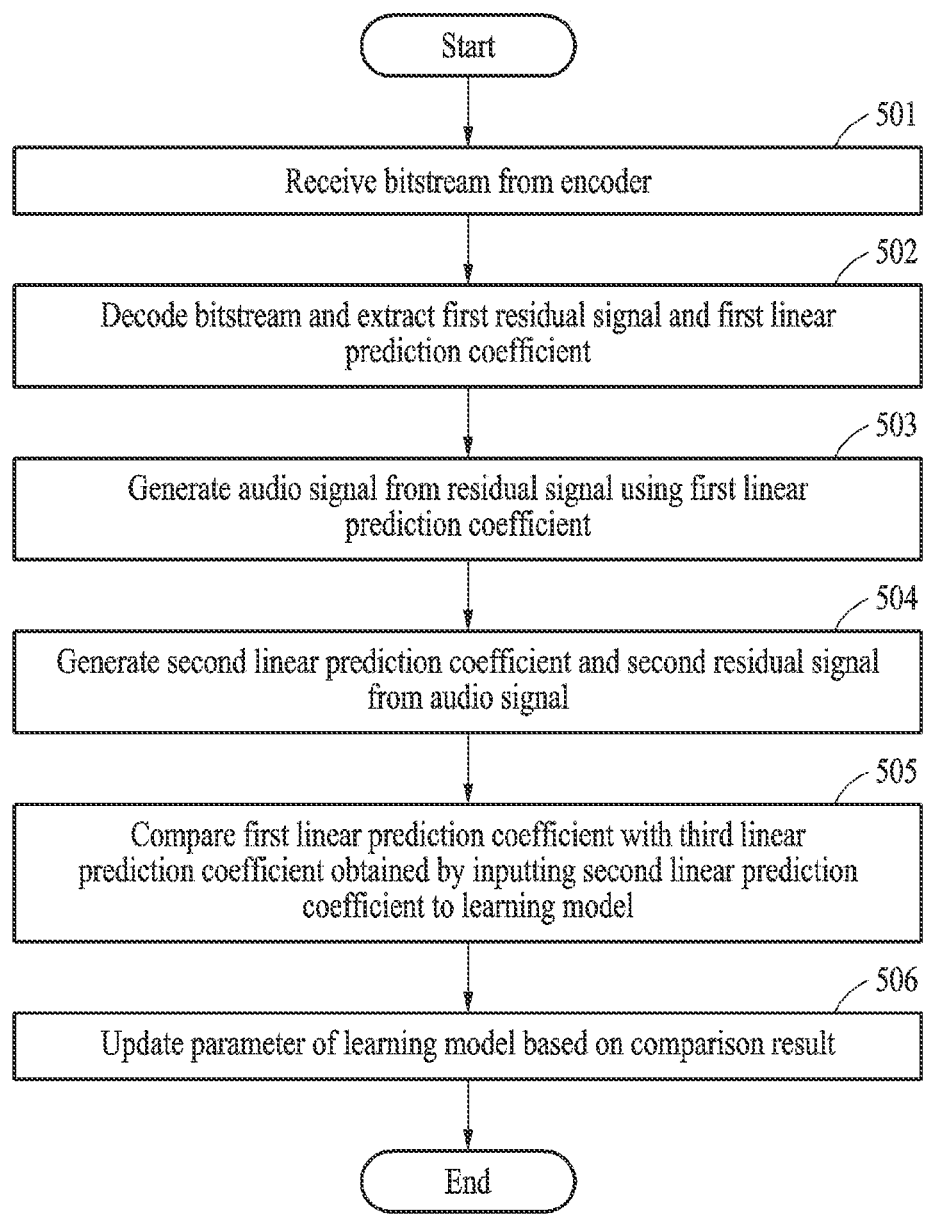
FIG. 5 is a flowchart illustrating a training method of a learning model according to an example embodiment.

FIG. 5 is a flowchart illustrating a training method of a learning model according to an example embodiment.

In operation 501, the decoder may receive a bitstream. In operation 502, the decoder may extract a first residual signal and a first linear prediction coefficient from the bitstream and decode the first residual signal. The first residual signal and the first linear prediction coefficient may be extracted from the original audio signal by the encoder. Step 501 may correspond to the LPC analysis process 406 of FIG. 4.

In operation 503, the decoder may generate an audio signal from the first residual signal using the first linear prediction coefficient. Step 502 may correspond to the LPC synthesis process 409 of FIG. 4. The decoder may restore the audio signal from the residual signal using the first linear prediction coefficient. Since the audio signal is a restored audio signal, it can be distinguished from the original audio signal received by the encoder.

In operation 504, the decoder may generate a second linear prediction coefficient and a second residual signal from the audio signal. It may correspond to the LPC analysis process 411 of FIG. 4. The second linear prediction coefficient and the second residual signal may mean a linear prediction coefficient and a residual signal extracted from the first audio signal through linear prediction coding.

In operation 505, the decoder may compare the first linear prediction coefficient with the third linear prediction coefficient obtained by inputting the second linear prediction coefficient to the learning model. In operation 506, the decoder may update a parameter of the learning model based on the comparison result.

The second linear prediction coefficient may be input as training data of the training model. The learning model may output a third linear prediction coefficient with respect to the second linear prediction coefficient. The third linear prediction coefficient may mean a linear prediction coefficient output from the second linear prediction coefficient by the learning model.

Further, the decoder calculates the value of the loss function based on a difference between the third linear prediction coefficient output from the learning model and the original linear prediction coefficient generated from the original audio signal, and may update a parameter included in the learning model such that the value of the loss function is minimized.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An audio signal decoding method comprising:
   extracting a first residual signal and a first linear prediction coefficient by decoding a bitstream received from an encoder;
   generating a first audio signal from the first residual signal using the first linear prediction coefficient;
   generating a second linear prediction coefficients and a second residual signal from the first audio signal;
   obtaining a third linear prediction coefficient by inputting the second linear prediction coefficient into a trained learning model; and
   generating a second audio signal from the second residual signal using the third linear prediction coefficient.

2. The method of claim 1, wherein the learning model generates an output linear prediction coefficient from an input linear prediction coefficient, and is trained using an original linear prediction coefficient extracted from an original audio signal received by the encoder as target data.

3. The method of claim 1, further comprising: extracting a third residual signal and a fourth linear prediction coefficient from the second audio signal.

4. A training method of a learning model used to decode an audio signal, comprising:
   extracting a first residual signal and a first linear prediction coefficient by decoding a bitstream received from an encoder;
   generating an audio signal from the first residual signal using the first linear prediction coefficient;
   generating second linear prediction coefficients and a second residual signal from the audio signal;
   comparing the first linear prediction coefficient with a third linear prediction coefficient obtained by inputting the second linear prediction coefficient into the learning model; and
   updating parameters of the learning model based on the comparison result.

5. The method of claim 4, wherein the first linear prediction coefficient is generated using linear predictive coding from an original audio signal received by the encoder.

6. An audio signal encoding method comprising:
extracting an original residual signal and an original linear prediction coefficient from an audio signal;
encoding the original residual signal; and
converting the encoded original residual signal and the original linear prediction coefficient into a bitstream,
wherein the original linear prediction coefficient is used as target data for training a learning model used by a decoder, and
the learning model generates an output linear prediction coefficient from an input linear prediction coefficient, and is trained using the original linear prediction coefficient as target data.

7. The method of claim 6, wherein the audio signal is restored by repeatedly processing linear prediction analysis and linear prediction synthesis using the learning model by the decoder.

* * * * *